(12) United States Patent
Hessling et al.

(10) Patent No.: US 9,260,201 B2
(45) Date of Patent: Feb. 16, 2016

(54) LIGHT FOR AN AIRCRAFT

(71) Applicants: Andre Hessling, Koblenz (DE); Martin Griesbach, Unna (DE)

(72) Inventors: Andre Hessling, Koblenz (DE); Martin Griesbach, Unna (DE)

(73) Assignee: GOODRICH LIGHTING SYSTEMS GMBH (DE)

(*) Notice: Subject to any disclaimer, the term of this patent is extended or adjusted under 35 U.S.C. 154(b) by 395 days.

(21) Appl. No.: 13/629,322

(22) Filed: Sep. 27, 2012

(65) Prior Publication Data
US 2013/0077332 A1 Mar. 28, 2013

(30) Foreign Application Priority Data

Sep. 28, 2011 (EP) ................................. 11183042

(51) Int. Cl.
H05B 33/08 (2006.01)
B64D 47/06 (2006.01)
F21V 5/04 (2006.01)
F21V 7/00 (2006.01)
F21V 7/08 (2006.01)
F21V 13/02 (2006.01)
F21V 13/04 (2006.01)
B64D 47/04 (2006.01)
F21Y 101/02 (2006.01)
F21Y 103/02 (2006.01)
F21Y 113/02 (2006.01)

(52) U.S. Cl.
CPC ............... *B64D 47/06* (2013.01); *F21V 5/046* (2013.01); *F21V 7/0016* (2013.01); *F21V 7/0033* (2013.01); *F21V 7/0058* (2013.01); *F21V 7/08* (2013.01); *F21V 13/02* (2013.01); *F21V 13/04* (2013.01); *B64D 47/04* (2013.01); *B64D 2203/00* (2013.01); *F21Y 2101/02* (2013.01); *F21Y 2103/022* (2013.01); *F21Y 2113/02* (2013.01)

(58) Field of Classification Search
USPC .................................................. 362/470–472
See application file for complete search history.

(56) References Cited

U.S. PATENT DOCUMENTS 8,403,530 B2 * 3/2013 Singer et al. ................. 362/243
2010/0020538 A1 1/2010 Schulz
2010/0039822 A1 2/2010 Bailey

* cited by examiner

*Primary Examiner* — Nimeshkumar Patel
*Assistant Examiner* — Brenitra M Lee
(74) *Attorney, Agent, or Firm* — Cantor Colburn LLP

(57) ABSTRACT

A light for an aircraft comprises a holder for carrying a first group of light emitting diodes arranged along a curvilinear line and a first reflector having an elliptic reflective partial surface defining a plurality of focal points forming a first curvilinear focal line coinciding with the light emitting sites of the first group of light emitting diodes and second focal point or curvilinear focal line. The light further includes a second optical unit comprising a single further focal point or curvilinear focal line that coincides with the second focal point or focal line of the first reflector. The light further includes a second group of light emitting diodes displaced axially with respect to the first light emitting diodes, which emit light that bypasses the second focal point or focal line of the first reflector of the first optical unit.

14 Claims, 7 Drawing Sheets

① light intensity distribution based on first LED's 420

② light intensity distribution based on second LED's 464

③ superimposed light intensity distributions based on first and second LED's 420, 464

① light intensity distribution based on first LED's 420
② light intensity distribution based on second LED's 464
③ superimposed light intensity distributions based on first and second LED's 420,464

LIGHT FOR AN AIRCRAFT

BACKGROUND OF THE INVENTION

1. Field of the Invention

The present invention relates to a light for an aircraft and, in particular, to an external light for an aircraft. While the present invention can be used primarily for each type of aircraft light, preferably the present invention is for a head light; taxi light, and runway turn-off light of an aircraft.

2. Description of the Prior Art

In the past, in the technical field of aerospace applications, light sources have been based on gas discharge technology or filaments. For several years, aircraft lights based on LED technology have found ever stronger commercial use. Examples for LED-based aircraft lights for different purposes are disclosed in U.S. Pat. No. 6,679,618, U.S. Pat. No. 7,572, 030, US-A-2007/0164875, WO-A-2009/156349, EP-B-1 217 663, EP-B-1 264 767, EP-B-1 552 983, EP-B-1 836 437, and GB-B-2,350,176.

In order to fulfill the official requirements of the Federal Aviation Association (FAA) with regard to the spatial light intensity distribution based on LED technology, a plurality of LEDs have to be arranged. In these designs, the available space and cooling capacities are only two of several concerns to be dealt with in order to obtain a high intensity light.

From U.S. Pat. No. 1,275,120 a projecting apparatus is known in which an ellipsoid reflector is used for illuminating a slide or film, i.e. a two-dimensional surface is illuminated to be projected on a projection screen or the like surface. Such a projection apparatus cannot be used in a lamp in which the light has to be directed in a pre-determined special light intensity distribution as in case of an aircraft light.

From WO-A-2008/031405 there is known a reflector emitter for a strong light beam using a plurality of lower-power lamps, revolution-ellipsoid sections are formed from revolution ellipsoids which are additionally cut in the focal-point plane. The sectional planes of all the mirrors are arranged in one common base plane and the mirror surface f the further concave mirror is directed in the direction opposite the others. The light sources are arranged in the first focal points of the revolution-ellipsoid sections and their second focal points and the focal point of the further concave mirror coincide. All the light beams which are incident on the surface of the revolution-ellipsoid sections are reflected onto the further concave mirror. Here, the light beams form a shaped bundle which leaves the reflector emitter at right angles to the base plane through the aperture.

Moreover, in WO-A-2008/089324 a folded light path LED array collimation optic is described which relates to a compact optical assembly which improves collimation of light produced by multiple LED light sources in a light engine. A shaped primary reflector located over the light engine reflects the light toward a larger shaped secondary reflector. The shapes of the reflectors are selected to cooperatively produce a highly collimated light beam. Color mixing may be improved by providing a plurality of facets on the reflective surfaces of at least one of the primary reflector or the secondary reflector.

Due to limited spaces and weight limitations in aircrafts, it is often desirable to include several light functions in a single light. This is true e.g. for the landing light, taxi light, and potentially runway turn-off light (RTO) which typically are realized by different housings using relative large mounting spaces which in particular at the noise landing gear (NLG) is limited.

SUMMARY OF THE INVENTION

Accordingly, there is a need for an aircraft light providing a high and, in particular, a very high LED-based light intensity and flux in a very confined envelope with the aircraft light fulfilling diverse light functionalities.

The present invention provides a light for an aircraft, comprising a holder for carrying a first group of a plurality of first light emitting diodes arranged along a curvilinear line and comprising light emitting sites for emitting light in a direction away from the curvilinear line, a first optical unit of a reflective type comprising a first reflector extending around the holder for reflecting light emitted from the first light emitting diodes and defining an optical axis of the first optical unit, wherein the first reflector comprises an elliptic reflective partial surface defining (i) a plurality of first focal points forming a first curvilinear focal line extending along the light emitting sites of the first light emitting diodes, and (ii) a plurality of second focal points, wherein at least a portion of the elliptic reflective partial surface is arranged so as to face towards the first light emitting diodes, a second optical unit of a reflective and/or refractive type for emitting light received from the first optical unit into a predetermined area, wherein the second optical unit comprises a single further focal point or a plurality of further focal points forming a further curvilinear focal line, and wherein the plurality of the second focal points of the first optical unit either coincide and are identical to the single further focal point of the second optical unit or are located along the further curvilinear focal line of the second optical unit, and at least a second group of a plurality of second light emitting diodes arranged in at least one section of the first optical unit and displaced with respect to the first light emitting diodes in the direction of the extension of the optical axis of the first optical unit, wherein the second light emitting diodes emit light bypassing the second focal point or points of the first reflector of the first optical unit.

The aircraft light according to the present invention comprises two optical units, namely a reflective type first optical unit and a second optical unit which can be of a reflective and/or refractive type. The first optical unit comprises two focal points or focal lines. To this end, the first optical unit comprises a first reflector having at least in part an elliptic reflective surface. The elliptic reflective partial surface of the first reflector surrounds a holder carrying a plurality of first light emitting diodes (LED) arranged along a curvilinear line, and, in particular, a circumferential portion of the holder facing away from the holder. Accordingly, the light emitting diodes emit their light in a direction away from the curvilinear line, i.e. radially and/or axially. Each first LED comprises a light emitting site (namely e.g. a pn junction) which emits the light of the first LED.

Due to the elliptic reflective partial surface, each section of the first reflector defines a first and a second focal point located on the primary chord, i.e. the major axis of the ellipse. Accordingly, the first reflector defines a plurality of first and second focal points with the first focal points, forming a first curvilinear focal line extending along the light emitting sites of the first LED. In other words, the light emitting sites are arranged in the first focal points.

The elliptic reflective partial surface is oriented such that the second focal points of the first reflector coincide so as to form a single second focal point or are arranged along a curvilinear line forming a second focal line.

In the light according to the present invention, each pair of a first and a second focal point is associated to a light emitting site of a first LED. Generally, the light emitting site as such coincides with the first focal point of an elliptic reflective partial surface section of the first reflector. The partial ellipse belonging to the elliptic reflective partial surface defines a second focal point which is associated to the respective light emitting site. The light emitting sites and the associated respective second focal points are located on the chords of the ellipses wherein all the chords may intersect in a common and single second focal point. As an alternative, depending on the orientation of the elliptic reflective partial surface sections, the chords of the ellipses can intersect at sites between the respective two focal points associated to the chords or the chords can be oriented such that they do not intersect each other. In both of the latter two cases, the second focal points define a curvilinear focal line.

Preferably, the curvilinear lines mentioned before are of a circular shape, which means that the first reflector is rotationally symmetric.

The first optical unit defines a light emitting opening or interface to the second optical unit. The second optical unit normally comprises a single focal point but can also comprise additional further focal points. The second optical unit can be of the reflective type or of the refractive type or can be a combination of both so as to include reflective optical elements as well as refractive optical elements. For example, the second optical unit may comprise a reflector (elliptic, parabolic, spheric, concave or convex) or a lens (collimating or diverging lens) or can comprise both types of these elements.

According to the present invention, the aircraft light is provided with a second group of a plurality of second LEDs. These second LEDs serve for emitting light which in combination with the optical features of the first and second optical units can be used for illuminating areas adjacent to the desired area which is illuminated by the first LEDs. The second group of the second LEDs is located within at least one section which is displaced with respect to the first LEDs in the direction of the extension of the optical axis of the first optical unit. This means that light from the second LEDs bypass the second focal point or points of the first reflector in front of or behind or laterally of the second focal point when viewed from the first focal point and along the optical axis of the first optical unit.

It is preferred to have two sections within which second LEDs are arranged wherein the two sections are preferably located diametrically opposite to each other with respect to the optical axis of the first optical unit. Due to this arrangement the additional light emitted from the second LEDs can create illuminated areas at diametrically opposite sides of the desired area illuminated by the first LEDs. Therefore, while the first LEDs highly concentrated illuminate the desired area, the area to be illuminated in a different light functionality can be widened by the light of the second LEDS. For example, this helps to adapt the aircraft light to fulfill several light functionalities. For example, the first LEDs serve for generating the head light functionality e.g. landing light or take-off functionality. By additionally activating the second LEDs a taxi light functionality can be realized by both the first and second LEDs.

According to another aspect of the present invention, the aircraft light may comprise a third group of third LEDs which are arranged displaced with respect to the first LEDs in a direction according to the extension of the optical axis and with respect to the second LEDs in a direction according to the extension of the curvilinear line along which the first LEDs are arranged. Again light from the third LEDs also bypass the second focal point or points of the first optical unit and serve for illuminating other areas adjacent to the desired area illuminated by the first LEDs. Accordingly, further light functionalities can be included and realized in the aircraft light according to the invention.

The main idea on which the invention is based is the design of the first optical unit as an elliptical reflector of rotational shape. The first focal points of the elliptic partial surface sections are located in the first LED optical center positions (i.e. in or adjacent to the light emitting sites, i.e. for example in the pn junctions) and the second focal points of the elliptical reflector act also as focal points or focal points for the second optical unit. The second optical unit preferably is provided as a parabolic or also elliptic reflector, a free-form reflector or a collimating or diverging lens. A fairly large distance between the LEDs and the second optical unit allows for a highly focused imaging optics. The maximum average distance between the first LEDs and the second focal points of the first reflector can be achieved according to the invention by means of an ellipsoid which is tilted out of the vertical orientation and which in the tilted position is rotated around the vertical axis so as to form a very unique rotationally symmetrical hollow shape defining at its inner surface at least in part an elliptic reflective surface.

According to another aspect of the present invention, in the light for an aircraft, maximum use is made of the available space envelope to create a projection of the first LEDs capable of reaching extreme high light intensities. The benefit is a very high LED-based light intensity and flux in a very confined envelope. Also in the present invention it is possible to mix various color and combine various types of first LEDs. The further benefit of the design according to the invention is that the ring-like structure allows for a very high number of first LEDs which can be used and which could be of different type and color, creating a high light flux, with all of the first LEDs creating a collimating beam on an axis if desired. This allows for variable colors of the light with the projected images all being in the identical target area—or maximum intensity when all first LEDs are switched on. Furthermore, with the concept of using different type of first LEDs, also first LEDs of different types than those currently available can be employed in the future. Also, very small light output contours, i.e. of a beacon light protruding from an air frame could be possible, which results in the reduction of any aerodynamic drag. Reading lights as well as all sorts of head lamps as well as beacon lights are feasible and can be designed based on the concept of the present invention.

In another embodiment of the present invention, the first reflector further comprises a spheric reflective partial surface adjacent the elliptic reflective partial surface. The spheric reflective surface portion is arranged underneath the holder for the first LEDs. The center of the spheric reflective partial surface is identical to the first focal line of the first reflector, i.e. identical to the curvilinear line along which the first LEDs and more specifically the light emitting sites of the first LEDs are arranged. The spheric reflective partial surface starts at the intersection of the chord of the ellipse with the ellipse defined by the elliptic reflective partial surface. Designing this area of the first reflector spherically results in retro-reflecting light emitted from the first LEDs back to the LEDs and from there via the elliptic reflective surface towards the second focal points of the first reflector. In other words, if the elliptic reflective surface would be continued beyond the intersection with the chord close to the first LEDs, the holder carrying the first LEDs would block any light emitted by the first LEDs and reflected by that portion of the elliptic reflective surface. Therefore, designing this part of the first reflector as a spheric reflective surface results in obtaining more light being directed in the desired direction and light distribution area and, accordingly, increasing the overall efficiency of the light.

According to another aspect of the present invention, the first optical unit comprises a light exiting opening defined by an edge of the elliptic reflective partial surface wherein the first LEDs are arranged away from the opening as well as between the opening and the spheric reflective partial surface.

According to still a further embodiment of the present invention, the plurality of the second focal points of the first optical unit coincide so as to form a single second focal point, wherein the second optical unit comprises a second reflector which is parabolically shaped and defines a light emitting opening for emitting light into a predetermined area and/or with a predetermined light intensity distribution.

According to another aspect of the present invention, the plurality of the second focal points of the first optical unit form a second curvilinear focal line, wherein the second optical unit comprises a second reflector which is parabolically shaped and defines a light emitting opening for emitting light into a predetermined area and/or with a predetermined light intensity distribution.

According to a further embodiment of the present invention, the plurality of the second focal points of the first optical unit coincide so as to form a single second focal point, wherein the second optical unit comprises a convex spheric reflector for reflecting light received from the first optical unit in a circumferential area around the second optical unit.

According to another embodiment of the present invention, the plurality of the second focal points of the first optical unit form a second curvilinear focal line, wherein the second optical unit comprises an optical lens.

According to still a further aspect of the present invention, the optical lens is a collimating lens.

According to a further embodiment of the present invention, the second optical unit comprises a transparent cover through which light exits from the second optical unit.

According to another aspect of the present invention, the curvilinear line along which the first LEDs are arranged, the second curvilinear focal line of the first optical unit and the further curvilinear focal line of the second optical unit are all substantially circular.

The set-up according to the present invention allows for the addition of a fourth group of fourth LEDs not included within the first reflector of the first optical unit. The fourth group of fourth LEDs can be located within the second optical unit or outside both optical units. The fourth LEDs contribute to a desired light intensity contribution (if necessary). The fourth LEDs should be located such that they do not block light exiting the second optical unit but add to that light. The fourth group of fourth LEDs can be used in combination with additional optical elements like TIR-based optical elements (Total Internal Reflection optical elements).

BRIEF DESCRIPTION OF THE DRAWINGS

A full and enabling disclosure of the present invention, including the best mode thereof, enabling one of the ordinary skill in the art to carry out the invention, is set forth in greater detail in the following description, including reference to the accompanying drawing in which.

DESCRIPTION OF A PREFERRED EMBODIMENT

Figure 1:
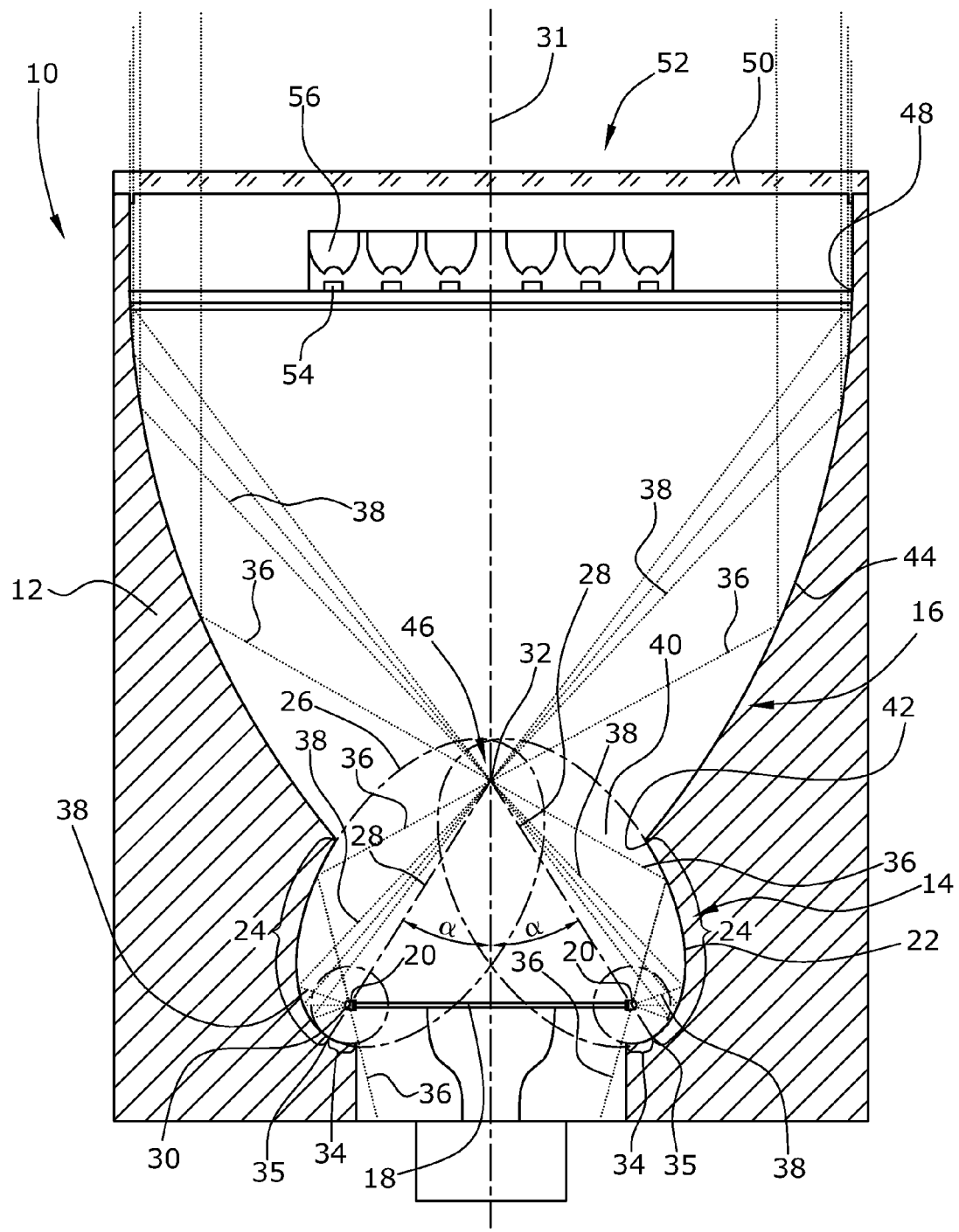
FIG. 1 is a cross-section showing a light for an aircraft and for explaining part of the basic concept of the invention.

In FIG. 1 of an aircraft light 10 is shown which is designed as a take-off light and in which the present invention can be used. The light 10 comprises a housing 12 defining a hollow space provided with a first and a second optical system 14,16.

The first optical system 14 is of the reflection type and comprises a holder 18 designed e.g. as a circular disk or ring with a plurality of first LEDs 20 arranged at the circumference of the disk or ring 18. The first LEDs 20 can be of the same type and the same color or can be different in type and color. The holder 18 is arranged within a first reflector 22 defined by two types of reflective partial surfaces formed at the inner surface of the hollow housing 12.

A first reflective surface of the first reflector 22 is elliptically shaped. This elliptical reflective partial surface 24 is spanned by a part of the circumference of an ellipse 26 which is inclined. Said ellipse 26 comprises an axis 28 or chord on which a first focal point 30 and a second focal point 32 are situated. Relative to the optical axis 31 of aircraft light 10, the ellipse 26 is inclined by the angle α. In case that, in this orientation the ellipse 26 rotates about the optical axis 31, the elliptic reflective partial surface 24 is spanned.

The first focal points 30 are located within the first LEDs 20 and are arranged along a curvilinear line, in particular a circular line. In this embodiment the second focal points 32 coincide to form a single second focal point.

The second type of reflective surface of the first reflector 22 is spherically concavely shaped. This second reflective surface 34 extends beyond the intersection 35 of the major axis 28 with the elliptic reflective partial surface 24 and, in FIG. 1, is referenced by numeral 34. The second reflective surface 34 is formed as part of a circle with the first LEDs 20 being the center of these circles. The circular shaped trough-like spheric reflective surface 34 extends around the optical axis 31 as a circular ring. Light emitted from the first LEDs 20 towards the spheric reflective surface 34 is reflected back to the respective first LED 20 and from there is directed towards the elliptic reflective partial surface 24 and from there towards the second focal point(s) 32 (see light ray 36 in FIG. 1). Light rays 38 emitted by the first LEDs 20 directly towards the elliptic reflective partial surface 24 are reflected towards the second focal point(s) 32.

The first optical unit 16 defines a light exiting opening 40 through which there will exit all the light emitted by the first LEDs 20 either directly or indirectly via reflections at the reflective surfaces of the first reflector 22. The opening 40 is limited by the edge 42 which also forms the boundary of the elliptic reflective partial surface 24.

In this embodiment according to FIG. 1, the second optical unit 16 is also of the reflective type and comprises a second reflector 44 which in this embodiment is parabolic.

The parabolic second reflector 44 has as its focal point 46 the second focal points 32 of the first optical unit 14. Accordingly, the light rays 36 and 38 shown in FIG. 1 are combined into light exiting the housing 12 in a direction parallel to the optical axis. The light emitting opening 48 of the housing 12 is covered by a transparent cover 50 and can further comprise a second group of light sources 52 having LEDs 54 and, as a specific feature of this embodiment, TIR-optical elements 56 associated to the individual LEDs 54. The second LEDs 54 provide additional light to the light emitted through the opening 48 of the housing 12 and the second LEDs provide an additional feature to the light 10 not necessary according to the present invention as far as the design of the housing 12 is related.

Figure 2:
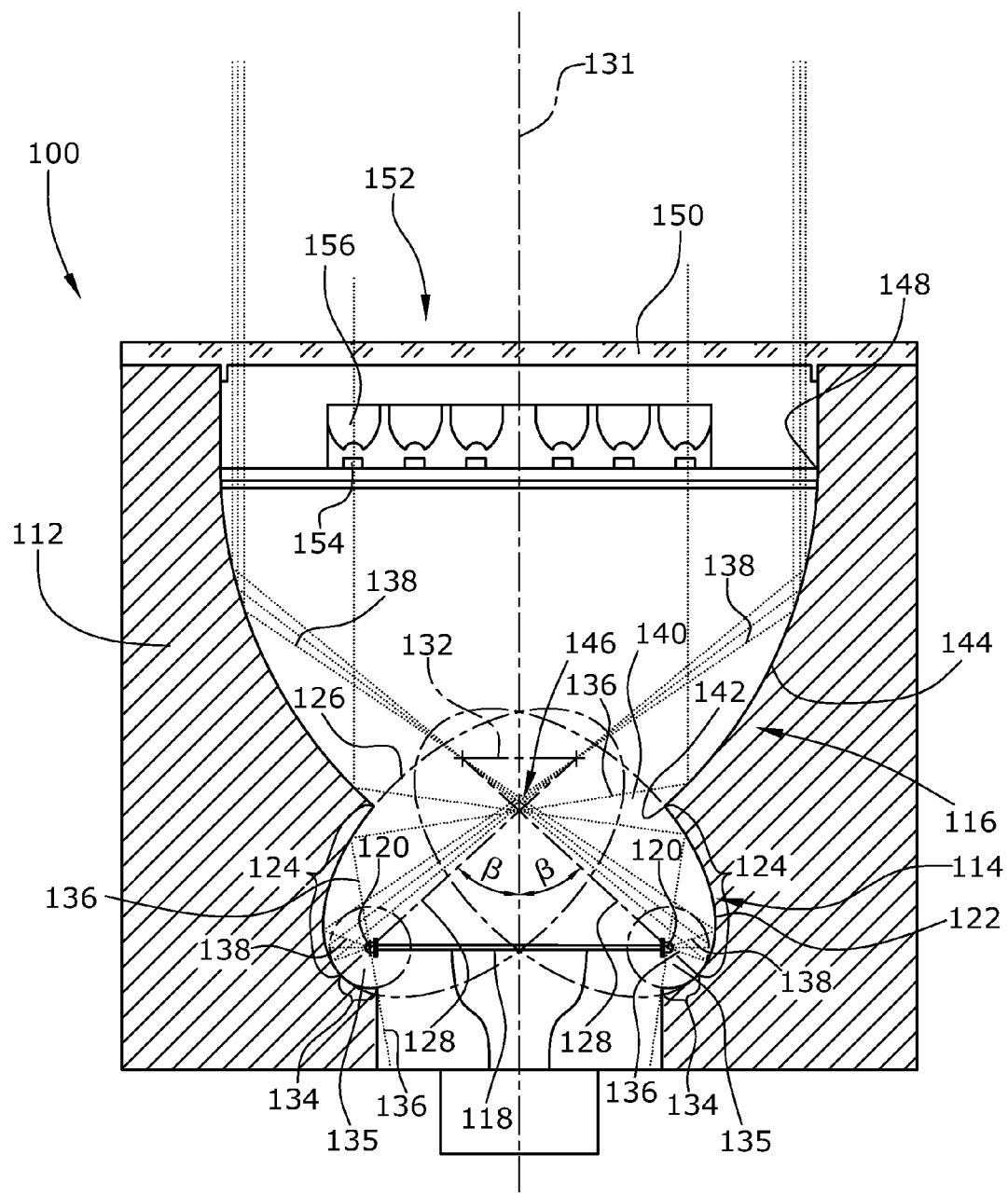
FIG. 2 is a cross-section through another type of aircraft light for explaining part of the basic concept of the present invention.

In FIG. 2 another type of aircraft light is shown in cross-section in which the present invention can be used. This type of aircraft light is directed to a head light 110, in particular a take-off lamp for an aircraft. The light 110 comprises a housing 112 defining a hollow space provided with a first and a second optical system 114,116.

The first optical system 114 is of the reflection type and comprises a holder 118 designed e.g. as a circular disk with a plurality of first LEDs 120 arranged at the circumference of the disk 118. The first LEDs 120 can be of the same type and the same color or can be different in type and color. The holder 118 is arranged within a first reflector 122 defined by two types of reflective partial surfaces formed at the inner surface of the hollow housing 112.

A first reflective surface of the first reflector 122 is elliptically shaped. This elliptical reflective partial surface 124 is spanned by a part of the circumference of an ellipse 126 which is inclined. Said ellipse 126 comprises an axis 128 or chord on which a first focal point 130 and a second focal point 132 are situated. Relative to the optical axis 131 of aircraft light 110, the ellipse 126 is inclined by the angle β being e.g. greater than angle α according to FIG. 1 and wherein the axis 128 of the inclined ellipse 126 intersects the optical axis 131 at a location between the two focal points of the ellipse. In case that, in this orientation the ellipse 126 rotates about the optical axis 131, the elliptic reflective partial surface 124 is spanned.

The first focal points 130 are located within the first LEDs 120 and are arranged along a curvilinear line, in particular a circular line. In this embodiment the second focal points 132 also form a circular line.

The second type of reflective surface of the first reflector 122 is spherically concavely shaped. This second reflective surface 134 extends beyond the intersection 135 of the major axis 128 with the elliptic reflective partial surface 124 and, in FIG. 2, is referenced by numeral 134. The second reflective surface 134 is formed as part of a circle with the first LEDs 120 being the center of these circles. The circular shaped trough-like spheric reflective surface 134 extends around the optical axis 131 as a circular ring. Light emitted from the first LEDs 120 towards the spheric reflective surface 134 is reflected back to the respective first LED 120 and from there is directed towards the elliptic reflective partial surface 124 and from there towards the second focal point(s) 132 (see light ray 136 in FIG. 2). Light rays 138 emitted by the first LEDs 120 directly towards the elliptic reflective partial surface 124 are reflected towards the second focal point(s) 132.

The first optical unit 116 defines a light exiting opening 140 through which there will exit all the light emitted by the first LEDs 120 either directly or indirectly via reflections at the reflective surfaces of the first reflector 122. The opening 140 is limited by the edge 142 which also forms the boundary of the elliptic reflective partial surface 124.

In this embodiment according to FIG. 2, the second optical unit 116 is also of the reflective type and comprises a second reflector 144 which in this embodiment is parabolic.

The parabolic second reflector 144 has as its focal point arrangement 146 the circular line of the second focal points 132 of the first optical unit 114. Accordingly, the light rays 136 and 138 shown in FIG. 2 are combined into light exiting the housing 112 in a direction parallel to the optical axis. The light emitting opening 148 of the housing 112 is covered by a transparent cover 150 and can further comprise a second group of light sources 152 having LEDs 154 and, as a specific feature of this embodiment, TIR-optical elements 156 associated to the individual LEDs 154. The second LEDs 154 provide additional light to the light emitted through the opening 148 of the housing 112 and the second LEDs provide an additional feature to the light 110 not necessary according to the present invention as far as the design of the housing 112 is related.

Figure 3:
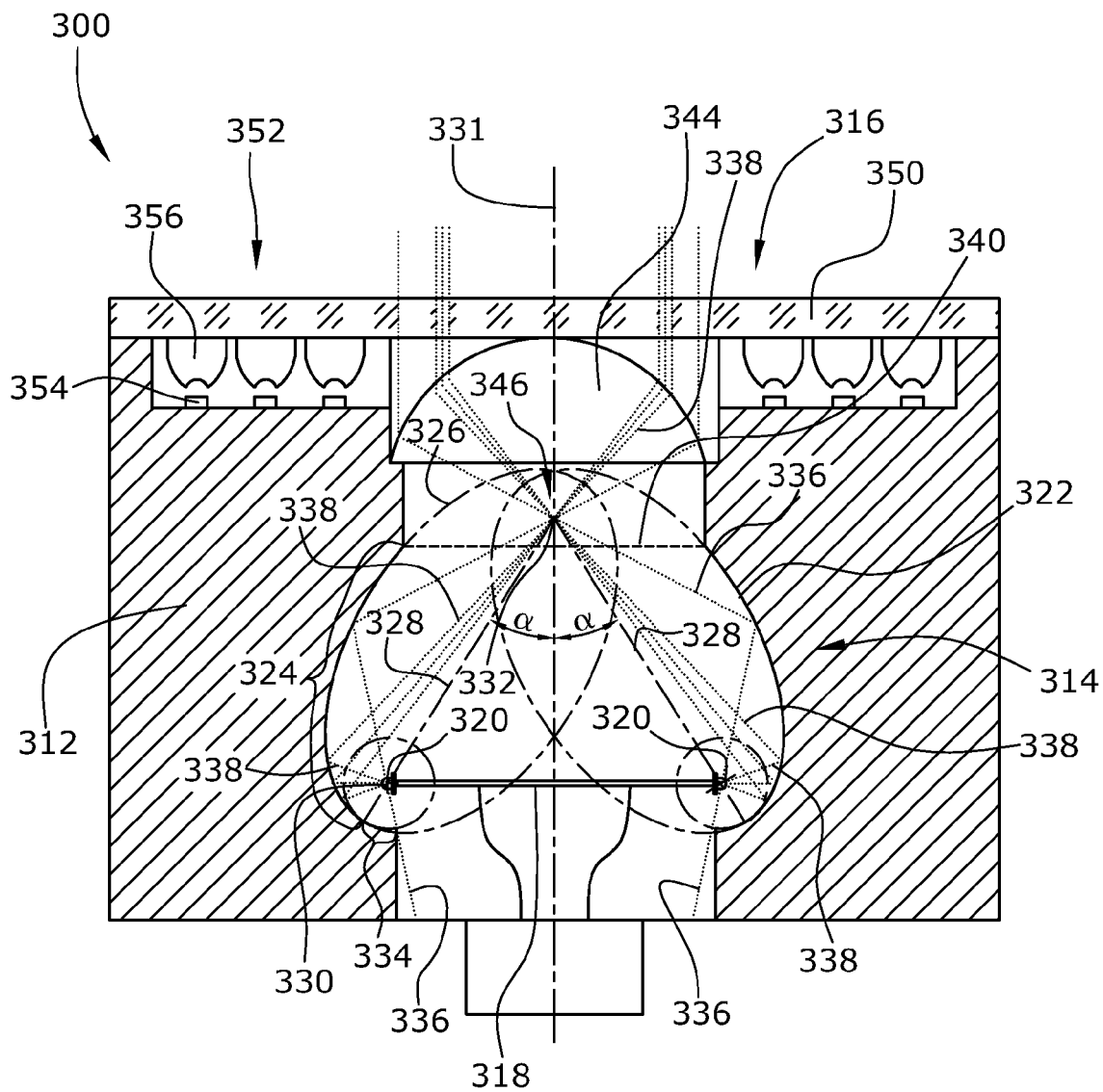
FIG. 3 is a cross-sectional view of a further aircraft light type for further explaining part of the basic concept of the present invention.

In FIG. 3 a further embodiment of the present invention is shown. It comprises a first optical unit 314 of the reflective type and a second optical unit 316 of the refractive type.

The first optical system 314 is of the reflection type and comprises a holder 318 designed e.g. as a circular disk with a plurality of first LEDs 320 arranged at the circumference of the disk 318. The LEDs first 320 can be of the same type and the same color or can be different in type and color. The holder 318 is arranged within a first reflector 322 defined by two types of reflective partial surfaces formed at the inner surface of the hollow housing 312.

A first reflective surface of the first reflector 322 is elliptically shaped. This elliptical reflective partial surface 324 is spanned by a part of the circumference of an ellipse 326 which is inclined. Said ellipse 326 comprises an axis 328 or chord on which a first focal point 330 and a second focal point 332 are situated. Relative to the optical axis 331 of aircraft light 310, the ellipse 326 is inclined by the angle α. In case that, in this orientation the ellipse 326 rotates about the optical axis 331, the elliptic reflective partial surface 324 is spanned.

The first focal points 330 are located within the first LEDs 320 and are arranged along a curvilinear line, in particular a circular line. In this embodiment the second focal points 332 coincide to form a single second focal point.

The second type of reflective surface of the first reflector 322 is spherically concavely shaped. This second reflective surface 334 extends beyond the intersection 335 of the major axis 328 with the elliptic reflective partial surface 324 and, in FIG. 3, is referenced by numeral 334. The second reflective surface 334 is formed as part of a circle with the first LEDs 320 being the center of these circles. The circular shaped trough-like spheric reflective surface first 334 extends around the optical axis 331 as a circular ring. Light emitted from the first LEDs 320 towards the spheric reflective surface 334 is reflected back to the respective first LED 320 and from there is directed towards the elliptic reflective partial surface 324 and from there towards the second focal point(s) 332 (see light ray 336 in FIG. 3). Light rays 338 emitted by the first LEDs 320 directly towards the elliptic reflective partial surface 324 are reflected towards the second focal point(s) 332.

The first optical unit 316 defines a light exiting opening 340 through which there will exit all the light emitted by the first LEDs 320 either directly or indirectly via reflections at the reflective surfaces of the first reflector 322. The opening 340 is limited by the edge 342 which also forms the boundary of the elliptic reflective partial surface 324.

The second optical unit 316 in the light 300 of FIG. 3 comprises a collimating lens 344 having its focal point 346 coinciding with the second focal point(s) 332 of the first reflector 322. The collimating lens 344 refracts the light of the first LEDs 320 so as to direct this light in parallel to the optical axis 330.

Outside the light beams there can be provided additional light sources 352 which can be designed as LEDs 354 in combination with TIR optical elements 356. The housing 312 can be closed by a transparent cover 350 as shown in FIG. 3.

Figure 4:
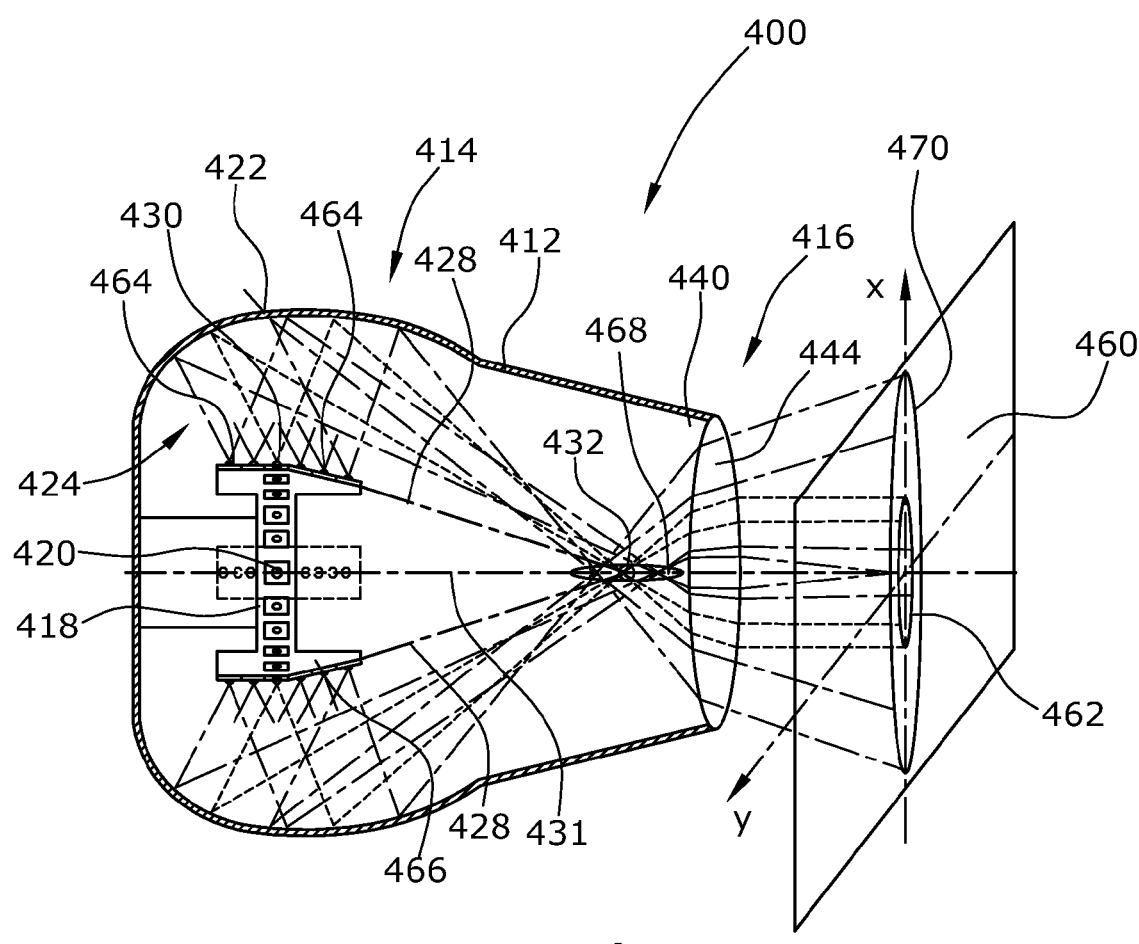
FIG. 4 shows an aircraft light according to an embodiment of the present invention, FIG. 5 a diagram showing the light distribution in the projection plane resulting from the first LEDs 420 of the light according to FIG. 4, FIG. 6 a diagram showing the intensity of light in x direction according to FIG. 5, FIG. 7. a diagram showing the intensity of light in y direction according to FIG. 5, FIG. 8 a diagram showing the light distribution in the projection plane resulting from both the first and second LEDs 420,464 of the light according to FIG. 4, FIG. 9 a diagram showing the intensity of light in x direction according to FIG. 8, and FIG. 10 a diagram showing the intensity of light in y direction according to FIG. 8.

FIG. 4 shows an embodiment according to the invention. In FIG. 4, a combined aircraft take-off and taxi light is shown. The light emitted by the combined aircraft light used as a take-off light is generated according to any one of the preceding embodiments wherein provision of the additional light sources 52,152,352 disclosed in these embodiments can be omitted in the combined aircraft light. For realizing the taxi light functionality, additional LEDs are provided as explained hereinbelow.

The first optical system 414 of the combined take-off and taxi light 400 is of the reflection type and comprises a holder 418 designed e.g. as a circular disk or ring with a plurality of first LEDs 420 arranged at the circumference of the disk or ring 418. The first LEDs 420 can be of the same type and the same color or can be different in type and color. The holder 418 is arranged within a reflector 422. The first reflector 422 is elliptically shaped. This elliptical reflective partial surface 424 is spanned by a part of the circumference of an ellipse which is inclined. Said ellipse comprises an axis or chord on which a first focal point 430 and a second focal point 432 are situated. Relative to the optical axis 431 of aircraft light 410, the ellipse is inclined by the angle α. In case that, in this orientation the ellipse rotates about the optical axis 431, the elliptic reflective partial surface 424 is spanned.

The first focal points 430 are located within the first LEDs 420 and are arranged along a curvilinear line, in particular a circular line. In this embodiment the second focal points 432 coincide to form a single second focal point.

The first optical unit 416 defines a light exiting opening 440 through which there will exit all the light emitted by the first LEDs 420 either directly or indirectly via reflections at the reflective surfaces of the first reflector 422.

The second optical unit 416 comprises a collimating lens 444.

The area within a projection plane 460 and illuminated by the first LEDs 420 is referred to by reference numeral 462 in FIG. 4.

The first optical unit 414 further comprises a second group of second LEDs 464 which are displaced with respect to the first LEDs 420. Two sub holders 466 for carrying the second LEDs 464 are mounted to the disk or ring 418 in diametrically opposite sections. Each of the sub holders 466 defines the section within which the second LEDs 464 are arranged and extends along a limited distance in the circumferential direction and the second LEDs 464 are located at both sides of the first LEDs 420 when viewed in the direction of the extension of the optical axis 431. Light emitted from the second LEDs 464 is collimated in an area 468 along the optical axis 431 which is located side-by-side with the second focal point 462 of the first optical unit 412 but outside of the area of the second focal point 462. By means of the collimating lens 444 of the second optical unit 416, an elliptic area 470 around the area 462 is illuminated by the light of the second LEDs 464 as shown in FIG. 4.

Figure 5:
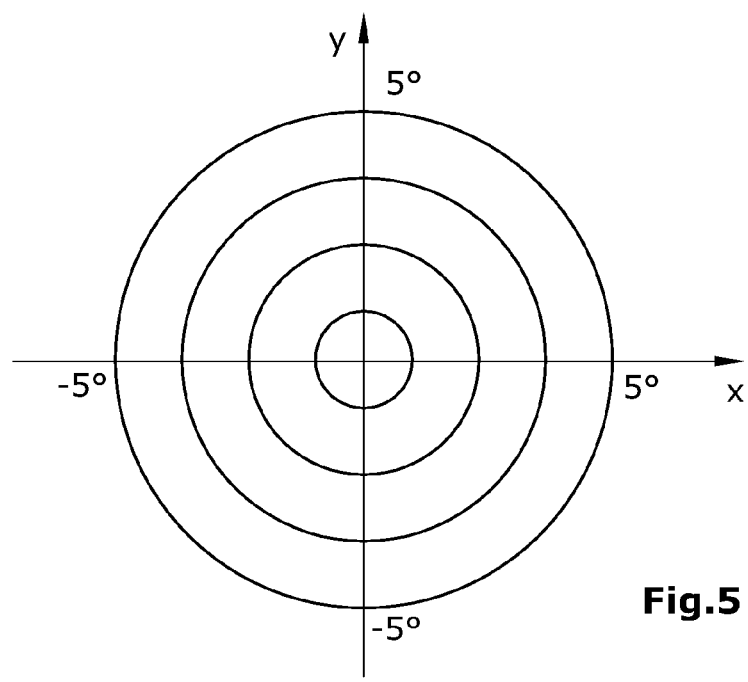
Figure 6:
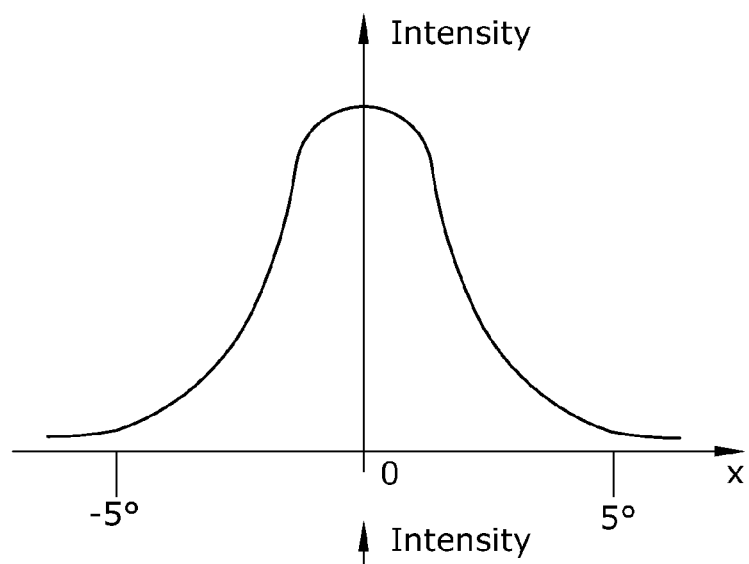
Figure 7:
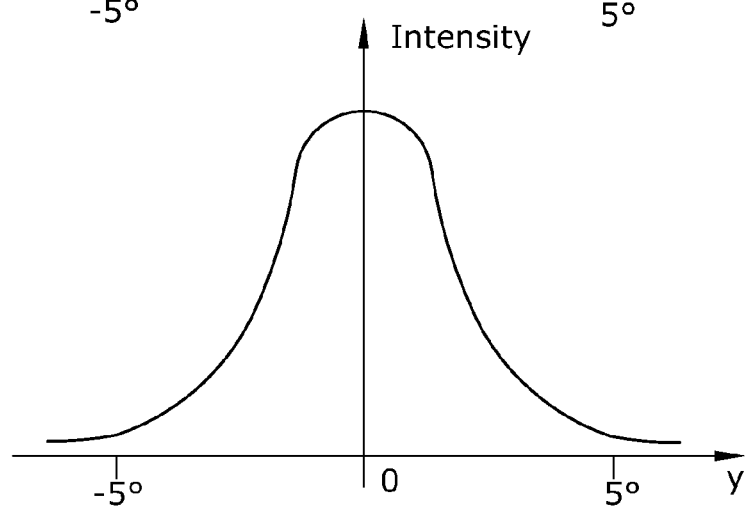
Figure 8:
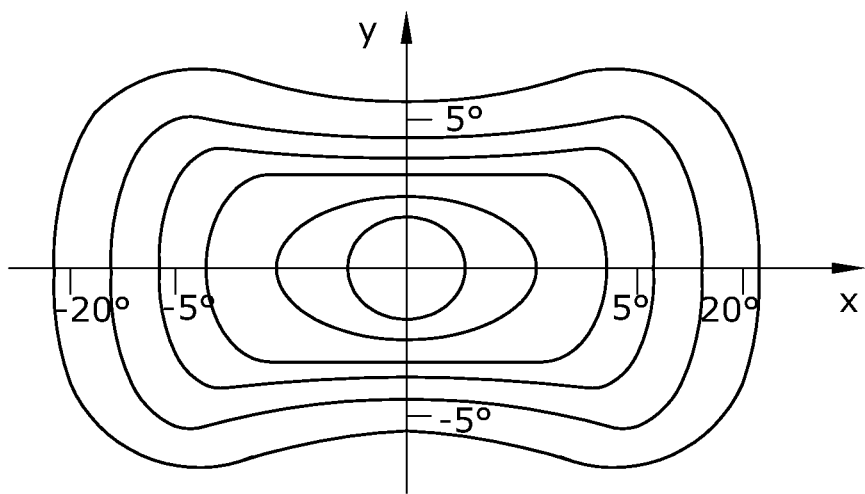
Figure 9:
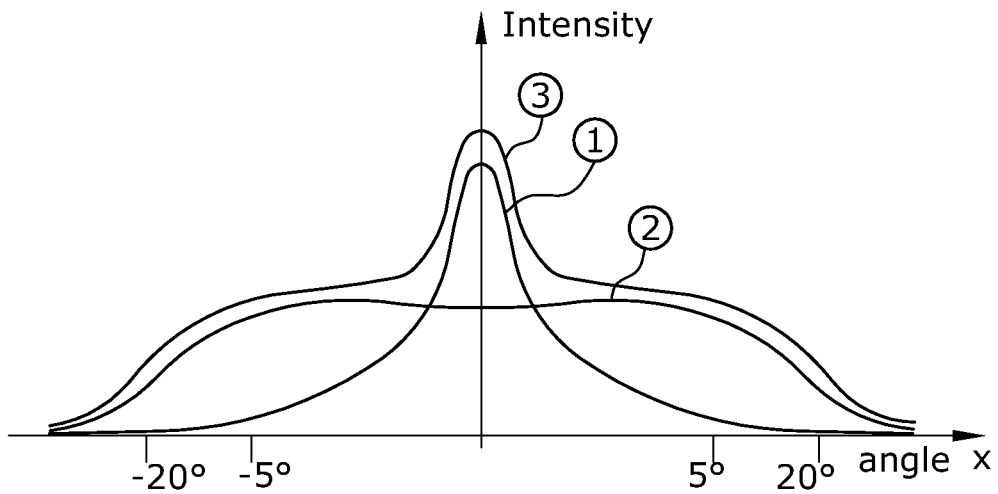
Figure 10:
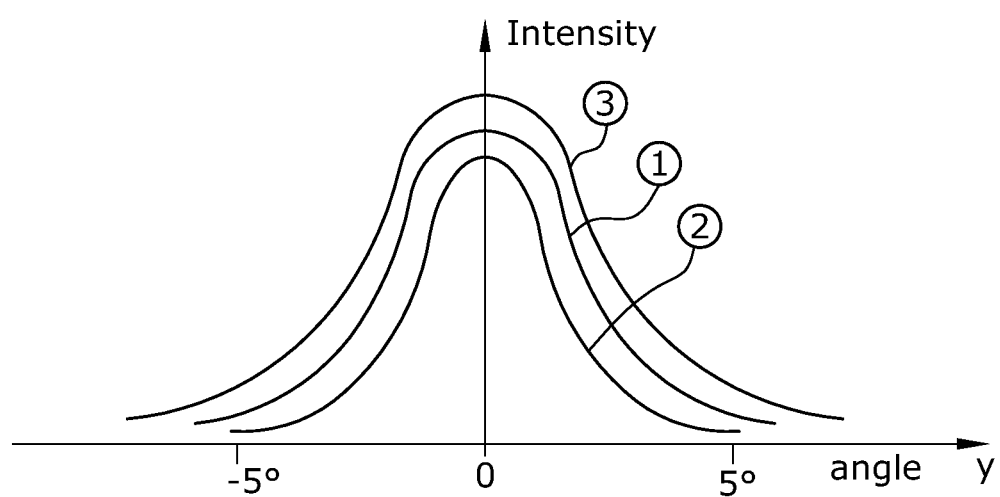

Accordingly, the illuminated areas 462 and 470 can be used in combination to realize e.g. a taxi light functionality of an aircraft. The light and light intensity distributions in the projection plane 460 and along the x and y directions are shown in FIGS. 5 to 10. FIGS. 5 to 7 relate to the light distribution resulting from the first LEDs 420 only, while FIGS. 8 to 10 relate to the light distributions resulting from both the first and second LEDs 420,464, wherein the first LEDs 420 may be dimmed.

Furthermore, third LEDs can be added to the disk or ring 418 of the first optical unit 414 (not shown in FIG. 4). The third LEDs are arranged at diametrically opposite sections of the disk or ring 418 which sections are offset by 90 degree with respect to the locations of the second LED sections represented by the sub holders 466. The third LEDs are arranged at their respective sub holders 466. In the same way the second LEDs are arranged at their sub holders 466. The third LEDs would generate a further elliptic illuminated area around the area 462 in the projection plane 460, with this further elliptic illuminated area being about 90 degree rotated with respect to the elliptic illuminated area 470. Therefore, by means of the third LEDs a further light functionality can be realized in the aircraft light according to this embodiment.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A light for an aircraft, comprising
   a holder for carrying a first group of a plurality of first light emitting diodes arranged along a curvilinear line and comprising light emitting sites for emitting light in a direction away from the curvilinear line,
   a first optical unit of a reflective type comprising a first reflector extending around the holder for reflecting light emitted from the first light emitting diodes and defining an optical axis of the first optical unit,
   wherein the first reflector comprises an elliptic reflective partial surface defining (i) a plurality of first focal points forming a first curvilinear focal line extending along the light emitting sites of the first light emitting diodes, and (ii) a plurality of second focal points, wherein at least a portion of the elliptic reflective partial surface is arranged so as to face towards the first light emitting diodes,
   a second optical unit of a reflective and/or refractive type for emitting light received from the first optical unit into a predetermined area,
   wherein the second optical unit comprises a single further focal point or a plurality of further focal points forming a further curvilinear focal line, and
   wherein the plurality of the second focal points of the first optical unit
      either coincide and are identical to the single further focal point of the second optical unit
   or
      are located along the further curvilinear focal line of the second optical unit, and at least a second group of a plurality of second light emitting diodes arranged in at least one section of the first optical unit and displaced with respect to the first light emitting diodes in the direction of the extension of the optical axis of the first optical unit, wherein the plurality of second light emitting diodes are arranged outside of the plurality of first focal points and are arranged within the first reflector for emitting light towards the first reflector, wherein the second light emitting diodes emit light bypassing the second focal point or points of the first reflector of the first optical unit, with an area illuminated by the light due to the second light emitting diodes being wider than an area illuminated by the light due to the first light emitting diodes.

2. The light according to claim 1, wherein the second light emitting diodes are arranged within at least two sections diametrically opposite to each other with respect to the optical axis of the first optical unit.

3. The light according to claim 1, further comprising a
third group of a plurality of third light emitting diodes arranged in at least one further section and displaced with respect to the first light emitting diodes in the direction of the extension of the optical axis of the first optical unit, wherein the further section of the third light emitting diodes is displaced with respect to the section or sections of the second light emitting diodes in the direction of the extension of the curvilinear line along which the first light emitting diodes are arranged, and wherein the third light emitting diodes emit light bypassing the second focal point or points of the first reflector of the first optical unit.

4. The light according to claim 3, wherein the third light emitting diodes are arranged within at least two further sections diametrically opposite to each other with respect to the optical axis of the first optical unit.

5. The light according to claim 1, wherein a second optical unit comprises an optical lens or a reflector.

6. The light according to claim 1, wherein the second optical unit comprises a optical collimating lens.

7. The light according to claim 1, wherein the first reflector further comprises a spheric reflective partial surface adjacent the elliptic reflective partial surface and extending from a portion thereof facing the first light emitting diodes.

8. The light according to claim 7, wherein the first optical unit comprises a light exiting opening defined by an edge of the elliptic reflective partial surface.

9. The light according to claim 8, wherein the first light emitting diodes are arranged away from the light exiting opening as well as between the opening and the spheric reflective partial surface.

10. The light according to claim 1, wherein the plurality of the second focal points of the first optical unit coincide so as to form a single second focal point and wherein the second optical unit comprises a second reflector which is parabolically shaped and defines a light emitting opening for emitting light into a predetermined area and/or with a predetermined light intensity distribution.

11. The light according to claim 1, wherein the plurality of the second focal points of the first optical unit form a second curvilinear focal line and wherein the second optical unit comprises a second reflector which is parabolically shaped and defines a light emitting opening for emitting light into a predetermined area and/or with a predetermined light intensity distribution.

12. The light according to claim 1, wherein the first light emitting diodes comprise light emitting diodes of the same or different colors and/or types.

13. The light according to claim 1, wherein a fourth group of fourth light emitting diodes is located within an area outside of the area through which light from the second optical unit exits and wherein the fourth light emitting diodes of the fourth group emit additional light directed into a predetermined area.

14. The light according to claim 1, wherein the second group of the plurality of second light emitting diodes is arranged on the holder.

* * * * *